Patented Dec. 13, 1949

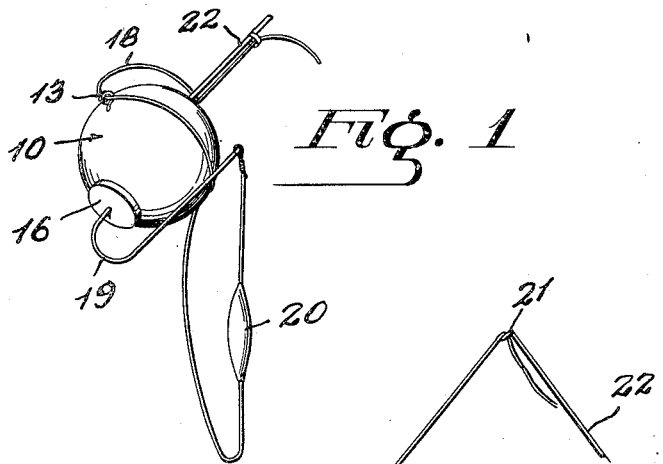
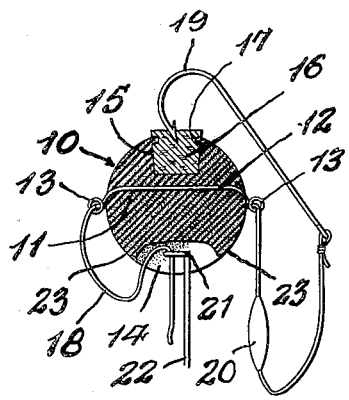
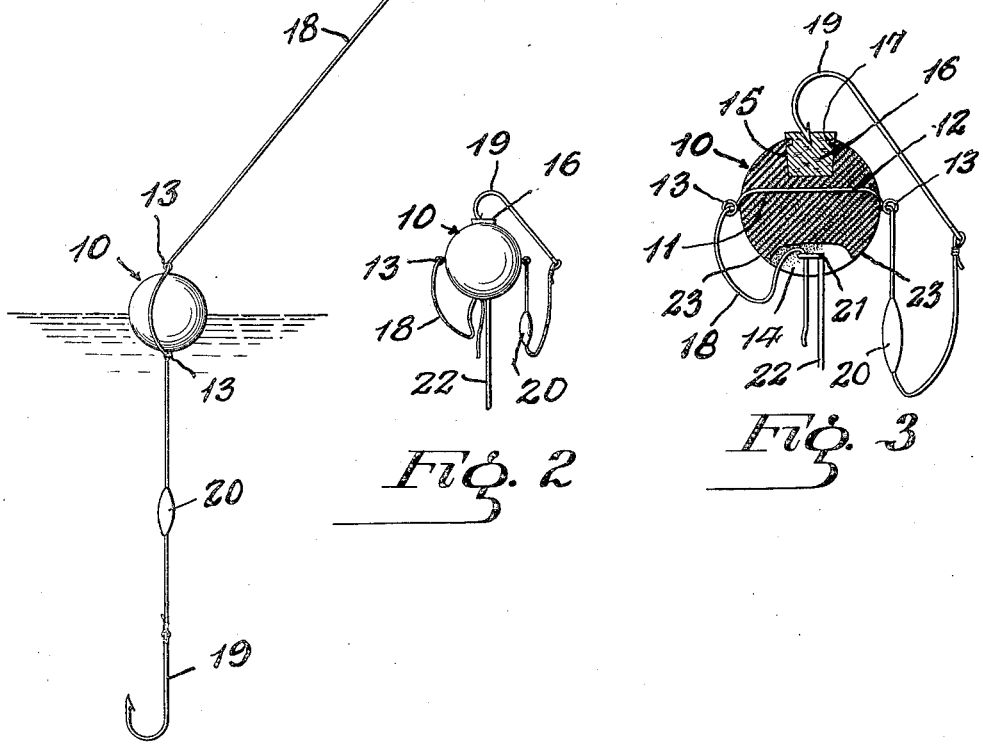

2,491,182

UNITED STATES PATENT OFFICE 2,491,182

COMBINED FISH LINE FLOAT, ROD TIP, AND HOOK PROTECTOR

Theodore A. Jaske, Chicago, Ill.

Application July 26, 1948, Serial No. 40,686

2 Claims. (Cl. 43—49)

This invention relates to a fish line float and it consists in the constructions, arrangements and combinations herein described and claimed.

It is the cardinal object of the invention to provide a fish line float so constructed as to provide means whereby the tip of the rod will be protected against damage when not in use, as well as to provide a means for covering the point of a hook, thus preventing liability of the hook becoming entangled in the clothing of a fisherman or vegetation when moving from one place to another.

It is also an object of the invention to provide a float of simple construction and including a novel means whereby the float may be readily attached to and adjusted upon a fish line so that the float may be moved therealong to accommodate various depths at which the hook will be suspended during fishing.

Additional objects, advantages and features of invention will be apparent from the following description, considered in conjunction with the accompanying drawing, wherein Figure 1 is a perspective view of the float mounted upon the tip of a portion of fishing rod, Figure 2 is a side elevation thereof, Figure 3 is an enlarged vertical sectional view thereof, Figure 4 is a side elevation illustrating the float in use.

There is illustrated a float 10 formed from any suitable elastic buoyant material, in the present instance, sponge rubber being shown. The float is shown in spherical form and has formed therethrough an opening 11 for accommodation of a line fastener 12. The fastener 12 consists of a strand of steel or other suitable wire, the ends of which are bent into respective helical loops 13, the latter being located in the diametrical center of the float and preferably lie closely adjacent the periphery of the float.

At right angles to the fastener 12 of the float, a slit 14 is formed in the periphery thereof extending inwardly thereof so as to enclose the tip of a fishing rod, as will be described. Diametrically opposite the slit 14, a substantially deep cylindrical recess 15 is formed within which there is frictionally seated a cork 16. The cork is of a diameter to firmly engage the wall of the recess and has formed adjacent the outer end, an annular groove 17 into which the peripheral edges of the recess 15 may expand as shown in Figure 3, and thereby secure the cork against accidental displacement. The cork is of a length to extend slightly beyond the recess 15 so that it may be manually removed, for renewal purposes, if found necessary.

To apply the float to a line, indicated at 18, the line is passed through one of the loops 13 and around the float to the other helical loop where it may be fixed by passing the line between coils of the loop. Or, if desired, the line may be secured between coils of the respective loops for retention of the float. The line, as is customary will include a conventional hook 19 and sinker 20.

When a fisherman desires to change his location, he merely draws or reels his line in so as to bring the float 10 into proximity of the top 21 of the rod 22. The point of the hook 19 is forced into the cork 16 as shown in Figures 1, 2 and 3, where it will secure against the entanglement in the clothing or otherwise, as well as being safe against possible injury to the fisherman. By applying pressure upon the float at points 23, the slit 14 will be caused expand or widen, permitting the tip 21 to be placed therewithin, and upon release of pressure, the sides of the slit will return to normal positions for securing the tip therewithin, as shown in Figure 2. It will be seen that the line as well as the float and the hook will be supported by the tip of the rod permitting ready carrying of the rod without liability of entanglement.

While I have shown and described a preferred form of the device this is by way of illustration only, and I consider as my own all such modifications in construction as fairly fall within the scope of the appended claims.

I claim:

1. A combined fish line float, rod and hook protector comprising a buoyant resilient body, a line fastener carried by said body, and a cork member in said body into which the point of a hook may be engaged, said body having a slit formed therein, and said body being compressible to expand the slit for admission of the tip of a rod therewithin.

2. A combined fish line float, rod and hook protector comprising a buoyant resilient body, a liner fastener carried by said body, said body having a recess at one end, an inwardly directed peripheral edge formed about said recess, a cork member engaged within said recess, said cork having an annular groove for reception of the peripheral edge of said recess, said cork being adapted to receive the point of a hook therein, said cork projecting a slight distance beyond the body member for manual removal of the cork, said body further having a slit formed therein, and said body being compressible to expand the slit for admission of the tip of a rod therein.

THEODORE A. JASKE.

REFERENCES CITED

The following references are of record in the file of this patent:

UNITED STATES PATENTS

| Number | Name | Date |
|---|---|---|
| 738,923 | Lewis | Sept. 15, 1903 |
| 1,468,720 | Low | Sept. 25, 1923 |